UNITED STATES PATENT OFFICE.

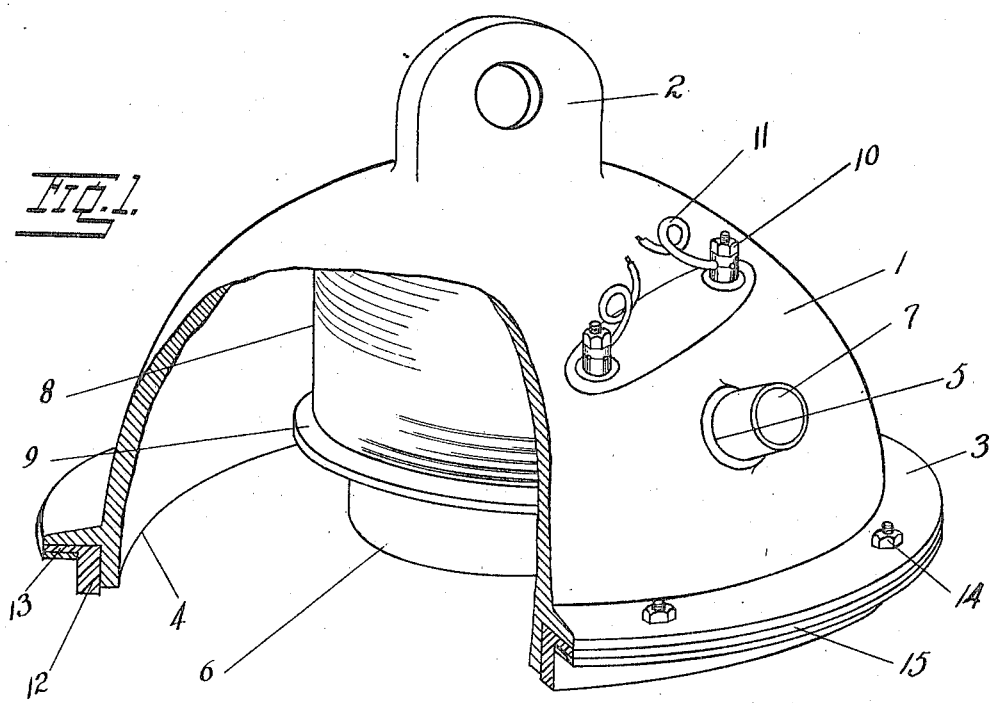
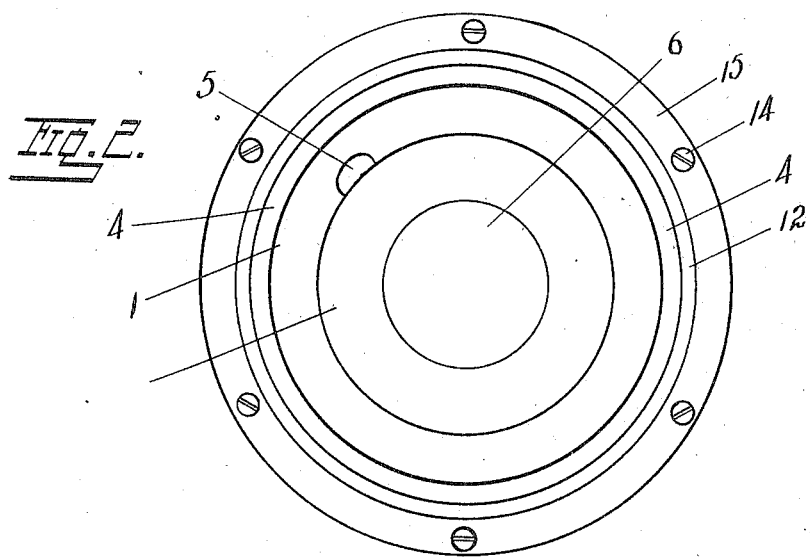

JOSEPH PAUL CHARLES CHARLEBOIS, OF TORONTO, ONTARIO, CANADA.

ELECTROMAGNETIC AND VACUUM LIFTER.

1,181,112. Specification of Letters Patent. Patented May 2, 1916.

Application filed December 7, 1914. Serial No. 875,955.

*To all whom it may concern:*

Be it known that I, JOSEPH PAUL CHARLES CHARLEBOIS, a subject of the King of Great Britain, and resident of 10 Division street, in the city of Toronto, county of York, Province of Ontario, in the Dominion of Canada, have invented certain new and useful Improvements in Electromagnetic and Vacuum Lifters, of which the following is a specification.

The invention relates to improvements in electro-magnetic and vacuum lifters as described in the present specification and illustrated in the accompanying drawings that form part of the same.

The invention consists essentially of the novel construction and arrangement of parts whereby an electro-magnetic coil is located within a vacuum cap and combines with said vacuum cap as a lifting device.

The objects of the invention are to provide a device for the purpose of lifting steel plates and other heavy objects, to simplify and cheapen the cost of manufacture of such devices and generally to produce a durable and efficient electro-magnetic and vacuum lifter.

In the drawings, Figure 1 is a perspective view of the device with the side partly broken away to disclose the electro-magnetic coil. Fig. 2 is a view looking into the device from below.

Like numerals of reference indicate corresponding parts in each figure.

Referring to the drawings, 1 is a vacuum cap made of any suitable material and being preferably of inverted cup shape and having on the outer side at the top thereof the pierced lug 2 for lifting purposes, the circumferential flange 3 at a point adjacent to the bottom 4, the opening 5 in the side thereof for the passage of air and on the inner side the central core or pin 6 extending outwardly to a point even with the bottom of the said cap.

7 is a nipple inserted in the opening 5 for the purpose of fastening a suitable hose for the withdrawal of air from the cap.

8 is a magnetic coil surrounding the pin 6 and extending from the inner wall of the cap to a point adjacent to the outer end of said pin and having at its lower end the outwardly extending flange 9. 10 are binding posts connected with the said magnetic coil 8 and attached to the outer wall of the cap 1 and connected to the electric wires 11 leading from the source of electrical current.

12 is a rubber gasket encircling the cap 1 on the underside of the flange 3 and extending a short distance below the bottom edge of the said cap for the purpose of taking up any unevenness in the object to be raised and thus prevent any inflow or escape of air under the cap 1, said rubber gasket having at its upper end the flange 13 fastened to the flange 3 by the bolts and nuts 14.

15 is a ring made of brass or any other suitable material and encircling the gasket 12 and holding it in position on the cap 1.

In the operation of this invention the device is placed on the steel plate or other object to be raised and the electric connection turned on causing the core or pin 6 to become magnetized, which magnetism is communicated to the wall of the cap thus causing the whole cap to become a large magnet maintained alive by the constant energization from the source of electric current and to draw down the cap to the level of the object and causing the rubber gasket to contract correspondingly, thus effectually sealing the cap and preventing the passage of air or liquid between the cap and the objects to which it adheres. The air within the cap is then withdrawn through the opening 5 by means of any suitable pump consequently creating a suction which together with the electro-magnet causes the cap to firmly grip the object and to be raised by any suitable means secured to the lug 2 in the top of the caps.

What I claim is:

1. In a device of the class described, a cap of inverted cup shape having a suction opening, a lug forming an eye at the top and an annular outwardly extending flange slightly above the lower edge, an annular rubber gasket in inverted L-cross section secured to said flange and extending below the said lower edge and a flexible suction member secured to said opening.

2. In a device of the class described, a vacuum cap having a suction opening and formed of inverted cup shape, a flexible suction member connected to said opening, and electromagnetic means within said cap forming an auxiliary gripping power on the material to be raised.

Signed at the city of Toronto, Ontario, this 18th day of August, 1914.

JOSEPH PAUL CHARLES CHARLEBOIS.

Witnesses:
W. G. HAMMOND,
M. BLACKWELL.

Copies of this patent may be obtained for five cents each, by addressing the "Commissioner of Patents Washington, D. C."